US008284948B2

(12) United States Patent
Kuroiwa

(10) Patent No.: US 8,284,948 B2
(45) Date of Patent: Oct. 9, 2012

(54) ENGINE SOUND PROCESSING APPARATUS

(75) Inventor: Kiyoto Kuroiwa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1001 days.

(21) Appl. No.: 12/229,247

(22) Filed: Aug. 21, 2008

(65) Prior Publication Data

US 2009/0052682 A1 Feb. 26, 2009

(30) Foreign Application Priority Data

Aug. 21, 2007 (JP) ................................ 2007-214596

(51) Int. Cl.
*H04B 3/20* (2006.01)
*H04B 1/00* (2006.01)
*H04B 5/00* (2006.01)
*G08B 3/10* (2006.01)

(52) U.S. Cl. ............ 381/66; 381/86; 381/79; 340/384.3

(58) Field of Classification Search .................... 381/63, 381/66, 61

See application file for complete search history.

(56) References Cited

U.S. PATENT DOCUMENTS 5,237,617 A * 8/1993 Miller ............................ 381/61
6,356,185 B1 * 3/2002 Plugge et al. .............. 340/384.3
6,504,935 B1 * 1/2003 Jackson .......................... 381/61
2005/0094826 A1 * 5/2005 Morishita ....................... 381/86
2005/0201570 A1 * 9/2005 Honji .............................. 381/86
2006/0177797 A1 * 8/2006 Costello et al. ................. 434/29
2008/0192954 A1 * 8/2008 Honji et al. ..................... 381/86

FOREIGN PATENT DOCUMENTS

JP 2004-074994 3/2004
JP 2005-134749 5/2005

* cited by examiner

*Primary Examiner* — Matthew Landau
*Assistant Examiner* — Khaja Ahmad
(74) *Attorney, Agent, or Firm* — Pillsbury Winthrop Shaw Pittman LLP

(57) ABSTRACT

An engine sound processing apparatus includes an engine sound signal generating section that generates an engine sound signal indicating an engine sound generated in an engine room of a vehicle, a signal processing section that includes a reverberation effect applying portion which applies a reverberation effect to the engine sound signal and a mixing portion which mixes the engine sound signal to which the reverberation effect is not applied and the engine sound signal to which the reverberation effect is applied, a reverberation effect controlling section that instructs the reverberation effect applying portion to apply the reverberation effect to the engine sound signal, a mixing balance setting section that sets a mixing balance in the mixing portion, and a speaker that outputs a sound on the basis of the engine sound signal being output from the signal processing section. In a case that both of an accelerator opening and an engine speed are increased, the mixing balance setting section controls an occupation rate of the second engine sound signal in the engine sound signal so as to be increased as the engine speed is increased. When other than the case, the mixing balance setting section controls the occupation rate of the second engine sound signal in the engine sound signal so as to become zero.

3 Claims, 5 Drawing Sheets

| VEHICLE SPEED S | REVERBERATION TIME RT | DIFFUSION Dif |
|---|---|---|
| 0 km/h | 0.3 sec | 1 |
| 10 km/h | 0.3 sec | 1 |
| 20 km/h | 0.3 sec | 1 |
| 30 km/h | 0.5 sec | 2 |
| 40 km/h | 0.8 sec | 4 |
| 50 km/h | 1.0 sec | 5 |
| 60 km/h | 1.5 sec | 8 |
| 70 km/h | 2.0 sec | 10 |
| 80 km/h | 2.5 sec | 10 |
| 90 km/h | 2.5 sec | 10 |
| 100 km/h | 2.5 sec | 10 |

| | | | | |
|---|---|---|---|---|
| TIME GRADIENT OF THE ENGINE SPEED EC | ↗ | ↗ | ↘ | ↘ |
| TIME GRADIENT OF THE ACCELERATOR OPENING AO | ↗ | ↘ | ↘ | ↗ |
| **Val** | VALUE IN A RANGE (0, 100) | **0** | **0** | **0** |

ENGINE SOUND PROCESSING APPARATUS

BACKGROUND

The present invention relates to the technology to reproduce a processed engine sound in a vehicle interior in response to driving conditions such as an engine speed, a pressing stroke of an accelerator pedal, a vehicle speed, etc.

In recent times the vehicle that emits the smaller engine sound to the vehicle exterior is demanded from the anti-noise viewpoint, still the user makes a request to enjoy a feeling of acceleration or a powerful engine sound in the vehicle interior. For this purpose, various engine sound processing apparatus for catching the engine sound by microphones in the vehicle, then applying a process to this sound, and outputting the processed sound in the vehicle interior have been proposed as the technological section that meets such request. For example, in Patent Literature 1, the system for picking up the engine sound generated in the vehicle, then adjusting the frequency characteristic of this engine sound such that a sound volume in the low-pitched sound is raised in answer to the driving conditions, or the like, and then emitting the processed sound in the vehicle interior has been proposed. Also, in Patent Literature 2, the system for adjusting levels of predetermined degree components of sound waves corresponding to the engine speed in the picked-up engine sound, and then emitting the processed sound in the vehicle interior has been proposed.

[Patent Literature 1] JP-A-2005-134749

[Patent Literature 2] JP-A-2004-74994

Meanwhile, it has been known that a feeling of acceleration that a driver feels from the engine sound depends largely on a spreading feeling of a sound image of the engine sound, i.e., a sound level of a reverberation sound, a reverberation time, etc. Therefore, in order to improve a feeling of acceleration that the driver feels from the engine sound, it is important that an appropriate reverberation sound should be applied to the picked-up engine sound (referred to as a "applying of a reverberation effect" hereinafter). However, it is impossible to apply a reverberation effect in the mode that particular frequency components contained in the engine sound are emphasized, as in the technology disclosed in Patent Literature 1 or 2. Also, it may be considered that the feeling of acceleration should be created by applying a reverberation effect, which has a predetermined reverberation level and a predetermined reverberation time, in the engine sound obtained by the technology disclosed in Patent Literature 1 or 2. In this event, the reverberation effect applied irrespective of the actual driving conditions could cause the driver to feel the feeling of acceleration strange.

SUMMARY

The present invention has been made in view of the above problem, and it is an object of the present invention to provide an engine sound processing apparatus capable of producing a feeling of acceleration in line with driving conditions, by processing a picked-up engine sound or a reproduced engine sound into an engine sound having a reverberation effect in line with the driving conditions and then providing the processed engine sound to a driver.

In order to solve the above problem, the present invention provides an engine sound processing apparatus, comprising:

an engine sound signal generating section that generates an engine sound signal indicating an engine sound generated in an engine room of a vehicle;

a signal processing section that includes:

a reverberation effect applying portion which applies a reverberation effect to the engine sound signal; and a mixing portion which mixes the engine sound signal to which the reverberation effect is not applied and the engine sound signal to which the reverberation effect is applied;

a reverberation effect controlling section that instructs the reverberation effect applying portion to apply the reverberation effect having a reverberation time set in response to a vehicle speed or a width of a diffusion set in response to the vehicle speed to the engine sound signal;

a mixing balance setting section that sets a mixing balance in the mixing portion; and a speaker that outputs a sound on the basis of the engine sound signal being output from the signal processing section, wherein in a case that both of an accelerator opening and an engine speed are increased, the mixing balance setting section controls an occupation rate of the engine sound signal to which the reverberation effect is applied in the engine sound signal being output from the mixing portion so as to be increased as the engine speed is increased; and wherein when other than the case, the mixing balance setting section controls the occupation rate of the engine sound signal to which the reverberation effect is applied in the engine sound signal being output from the mixing portion so as to become zero.

Preferably, the signal processing section has an adjusting portion which multiplies the engine sound signal to which the reverberation effect is applied by a coefficient of 1 or less in response to the engine speed when the engine speed is lower than a threshold value to supply the multiplied engine sound signal to the mixing portion.

Preferably, the signal processing section has a distortion applying portion which applies a distortion, which is determined on the basis of at least one of a feature of the vehicle, the vehicle speed, the engine speed, and the accelerator opening, to the engine sound signal supplied to the reverberation effect applying portion or the engine sound signal being output from the reverberation effect applying portion.

According to the present invention, the picked-up or reproduced engine sound is processed into the engine sound to which a reverberation effect is applied in line with the driving conditions such as vehicle speed, engine speed, accelerator opening, and the like. Therefore, such an effect can be achieved that the feeling of acceleration can be produced in line with the driving conditions.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS (A: First Embodiment)

Figure 1:
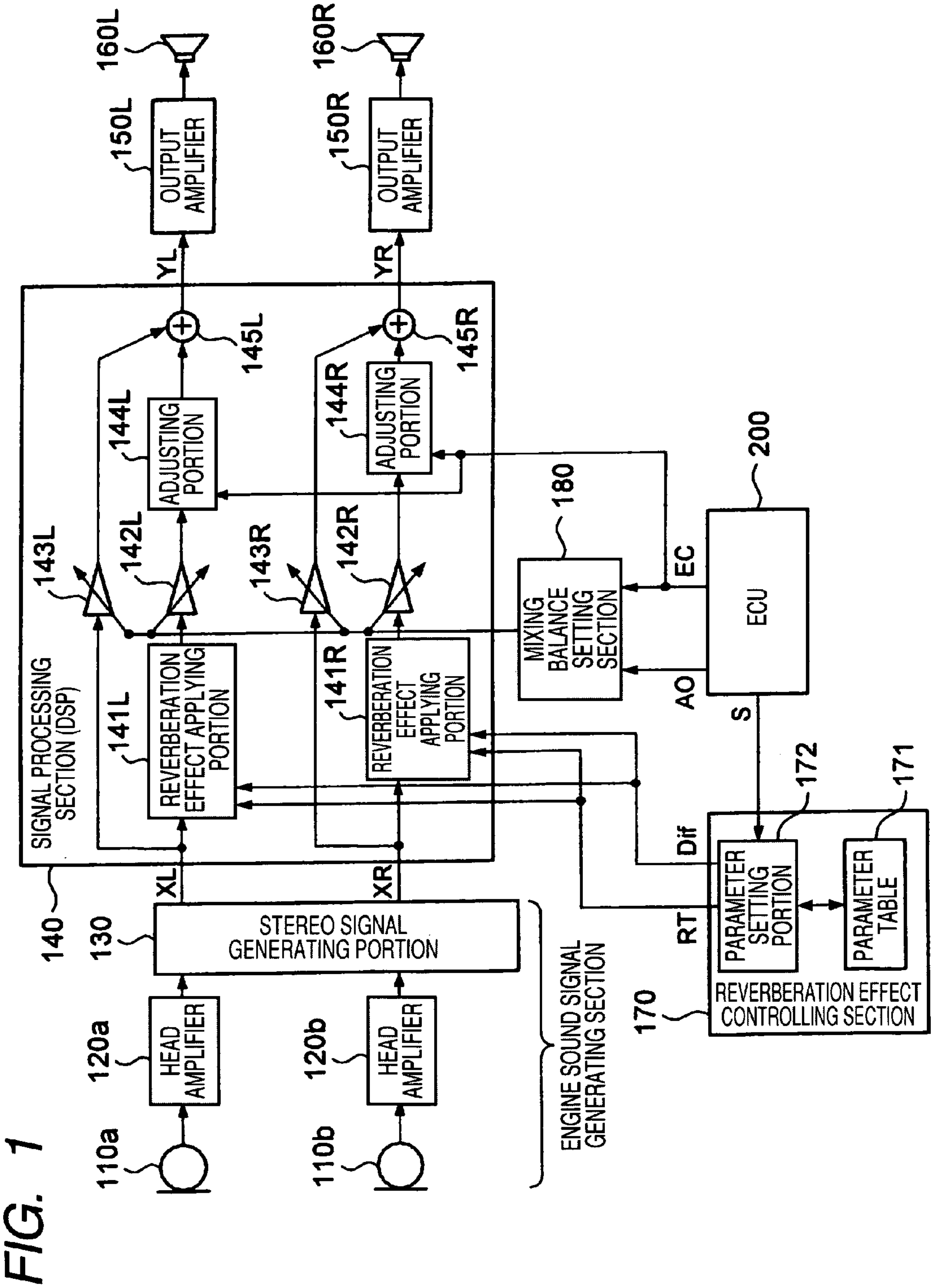
FIG. 1 is a block diagram showing a configurative example of an engine sound processing apparatus according to an embodiment of the present invention.

FIG. 1 is a block diagram showing a configurative example of an engine sound processing apparatus according to an embodiment of the present invention. The engine sound processing apparatus shown in FIG. 1 is incorporated into the vehicle that runs by using the internal combustion engine such as the gasoline engine, the diesel engine, or the like as a power source, for example, and applies appropriately processes to the engine sound picked up in the engine room and outputs the processed engine sound in the vehicle interior.

A configuration of the engine sound processing apparatus according to the present embodiment will be explained in detail hereinafter.

Microphones 110*a* and 110*b* are provided to mutually different positions near intake ports, an engine, or the like, for example, in an engine room of the vehicle into which the engine sound processing apparatus is incorporated. The microphones 110*a* and 110*b* pick up the engine sound in their provided positions respectively, and then output an electric signal indicating the engine sound (referred to as an "engine sound signal" hereinafter) to head amplifiers 120*a* and 120*b* respectively. In the present embodiment, the case where the engine sound in the engine room is picked up by two microphones provided to mutually different positions in the engine room will be explained hereunder. In this case, the engine sound may be captured by a single microphone or the engine sound may be captured by three microphones or more. The head amplifiers 120*a* and 120*b* amplify the engine sound signal received from the microphones 110*a* and 110*b* up to a signal level that is suitable for various signal processes in circuits at later stages, and output amplified signals to a stereo signal generating portion 130. The stereo signal generating portion 130 constitutes the audio mixer, for example. The stereo signal generating portion 130 eliminates a noise component, etc. from the engine sound signals received from the head amplifiers 120*a* and 120*b*, then synthesizes both signals to generate engine sound signals XL and XR on left and right channels, and then outputs the engine sound signals XL and XR. In this manner, the microphones 110*a* and 110*b*, the head amplifiers 120*a* and 120*b*, and the stereo signal generating portion 130 have a role of an engine sound signal generating section that generates the engine sound signal. In the present embodiment, the engine sound signal generating section is constructed by the microphones, the amplifiers, and the audio mixer. In this case, the engine sound signal generating section may be constructed by a recording medium such as CD-ROM (Compact Disk-Read Only Memory), or the like in which waveform data of the engine sound are loaded, and a play unit that plays the engine sound signal in compliance with the waveform data read from the recording medium and outputs it.

As shown in FIG. 1, the engine sound signal XL and the engine sound signal XR generated by the stereo signal generating portion 130 are given to a signal processing section 140. The signal processing section 140 is composed of a DSP (Digital Signal Processor), for example. The signal processing section 140 generates engine sound signals YL and YR by applying a reverberation effect to the engine sound signals XL and XR received from the stereo signal generating portion 130 in response to the driving conditions such as accelerator opening as a pressing stroke of an accelerator pedal, engine speed, vehicle speed, etc. respectively, and outputs the engine sound signals YL and YR to output amplifiers 150L and 150R. The engine sound signals YL and YR output from the signal processing section 140 are amplified by the output amplifiers 150L and 150R up to a level suitable for the speaker drive respectively, then supplied to speakers 160L and 160R provided in the interior of the vehicle, and output from these speakers as the engine sound.

As shown in FIG. 1, the signal processing section 140 has two signal processing systems, i.e., the left channel signal processing system through which the engine sound signal XL is processed into the engine sound signal YL, and the right channel signal processing system through which the engine sound signal XR is processed into the engine sound signal YR. In the present embodiment, since the signal processing section 140 is composed of DSP, constituent elements of the above signal processing systems are incorporated into the signal processing section 140 as software modules. In this event, the signal processing section 140 may be of course constructed by a combination of electronic circuits corresponding to these software modules. As shown in FIG. 1, a reverberation effect applying portion 141L, amplifiers 142L and 143L, an adjusting portion 144L, and an adder 145L are contained in the left channel signal processing system, while a reverberation effect applying portion 141R, amplifiers 142R and 143R, an adjusting portion 144R, and an adder 145R are contained in the right channel signal processing system. In this manner, both signal processing systems have the same configuration respectively. Therefore, a configuration and functions of the left channel signal processing system will be explained by way of example hereunder.

The engine sound signal XL input into the signal processing section 140 is split into two signals, as shown in FIG. 1. One signal undergoes various signal processes by the reverberation effect applying portion 141L, the amplifier 142L, and the adjusting portion 144L and then is input into the adder 145L, and the other signal is amplified by the amplifier 143L and then is input into the adder 145L. The reverberation effect applying portion 141L is composed of the digital reverberator, for example. The reverberation effect applying portion 141L applies a reverberation effect defined by parameters given by a reverberation effect controlling section 170 (in the present embodiment, a reverberation time RT and a diffusion Dif) to the engine sound signal XL, and outputs a resultant signal to the amplifier 142L. Although details will be described later, the reverberation effect controlling section 170 gives the parameters, which indicate a longer reverberation time and a wider diffusion (a spread feeling of a sound image) as a vehicle speed S becomes higher, to the reverberation effect applying portion 141L. As a result, in the present embodiment, the engine sound signal to which the reverberation effect whose reverberation time becomes longer and whose diffusion becomes wider as the vehicle speed S becomes higher is applied is output from the reverberation effect applying portion 141L.

Both the amplifier 142L and the amplifier 143L are a variable-gain amplifier, and amplify the input signal in accordance with the given input/output characteristic (i.e., a ratio of an output signal level to an input signal level, that is, an amplification factor) and output the amplified signal respectively. These input/output characteristics of two amplifiers are set by a mixing balance setting section 180. Although details will be described later, the mixing balance setting section 180 sets the amplification factors of the amplifiers 142L and 143L in response to a time gradient of an engine speed EC and a time gradient of an accelerator opening AO respectively.

Figures 2, 3:
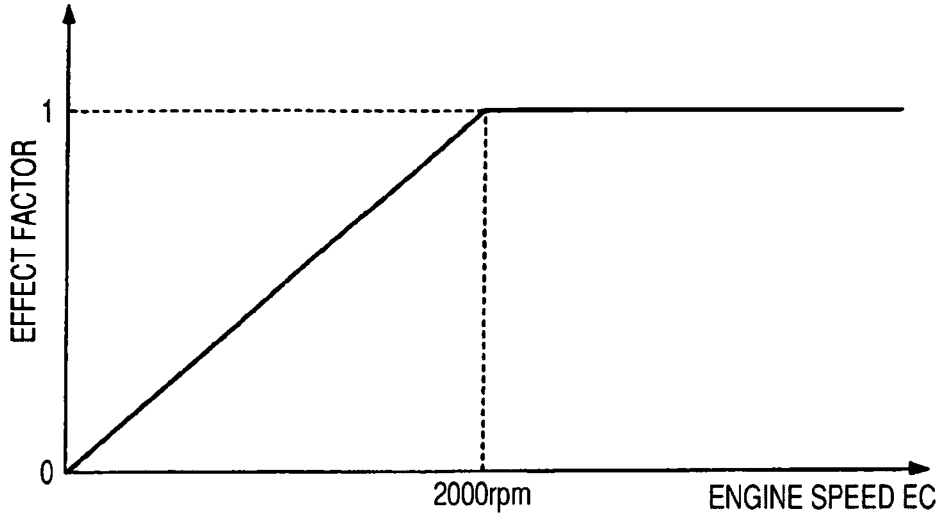
FIG. 2 is a graph showing an example of a functional relationship between an effect factor multiplied by an adjusting portion 144L and an engine speed EC.
FIG. 3 is a table showing an example of a parameter table 171 that a reverberation effect controlling section 170 possesses.

The adjusting portion 144L multiplies the engine sound signal XL output from the amplifier 142L by an effect factor corresponding to the engine speed EC and outputs a resultant signal, and thus adjusts finely the reverberation effect. FIG. 2 is a graph showing a functional relationship between the effect factor multiplied by the adjusting portion 144L and the engine speed EC. As shown in FIG. 2, the effect factor is increased linearly from "0" to "1" as the engine speed EC is increased from 0 to a predetermined threshold value (in the present embodiment, a value corresponding to 2000 rpm), and is fixed to 1 irrespective of the engine speed EC when the engine speed EC exceeds the above predetermined threshold value. In the present embodiment, the output signal of the amplifier 142L is multiplied by the effect factor that has the above functional relationship with the engine speed EC in the adjusting portion 144L. Therefore, in the interval in which the engine speed EC is below the above predetermined threshold value, such a fine adjustment is applied that the reverberation effect fades in as the engine speed EC is increased.

The adder 145L generates the engine sound signal YL by adding an output signal of the amplifier 143L and an output signal of the adjusting portion 144L, and outputs this signal to the output amplifier 150L. As described above, the reverberation effect is not applied to the engine sound signal XL that is input into the adder 145L via the amplifier 143L, while the reverberation effect is applied to the engine sound signal XL, which is input into the adder 145L via the reverberation effect applying portion 141L, the amplifier 142L, and the adjusting portion 144L, in response to the vehicle speed S. Also, an amplification factor is set to the amplifiers 142L and 143L in response to a time gradient of the engine speed EC and a time gradient of the accelerator opening AO respectively. Therefore, the adder 145L and the amplifiers 142L and the amplifier 143L have a role of a mixing portion mixes the engine sound signal to which the reverberation effect is applied in answer to the vehicle speed S and the engine sound signal to which the reverberation effect is not applied, at a mixing balance that is decided in response to a time gradient of the engine speed EC and a time gradient of the accelerator opening AO.

With the above, the configuration of the left channel signal processing system of the signal processing section 140 is explained.

(A-1: Configuration and Functions of the Reverberation Effect Controlling Section 170)

Next, a configuration and functions of the reverberation effect controlling section 170 will be explained in detail hereunder.

The reverberation effect controlling section 170 contains a parameter table 171 and a parameter setting portion 172, as shown in FIG. 1. The parameter table 171 is installed into the reverberation effect controlling section 170 in a state that this table is stored in a nonvolatile memory such as a flash ROM, or the like, for example. Parameters used to define the reverberation effect that should be applied to the engine sound of the vehicle that is running at that vehicle speed are correlated with data representing the vehicle speed and stored in this parameter table 171. FIG. 3 is a table showing an example of the parameter table 171. In the parameter table shown in FIG. 3, two type parameters, i.e., a parameter representing a reverberation time RT and a parameter representing a diffusion Dif are stored such that these parameters are correlated with the vehicle speeds given in eleven ways from 0 km/h to 100 km/h every 10 km/h respectively. In the present embodiment, as apparent by reference to FIG. 3, the parameter being correlated with the higher vehicle speed represents a longer reverberation time and a wider diffusion. The contents stored in the parameter table 171 are utilized in the course of the process that decides the parameter given to the reverberation effect applying portions 141L and 141R in response to the vehicle speed.

The parameter setting portion 172 is composed of CPU (Central Processing Unit), for example, and is connected to an ECU (Engine Control Unit) 200. Here, the ECU 200 executes the engine drive control in response to the driving operation such as an accelerator operation, or the like, and also measures the vehicle speed, the engine speed, and the like, and then notifies the driver about the measured result. The parameter setting portion 172 executes the processes of receiving the driving condition parameter representing the vehicle speed S from the ECU 200, then specifying the parameters representing the reverberation time RT and the diffusion Dif in response to the vehicle speed S represented by the driving condition parameter by referring to the contents stored in the parameter table 171, and then giving the parameters as the specified result to the reverberation effect applying portions 141L and 141R. For example, when the parameters representing the reverberation time RT and the diffusion Dif in response to the vehicle speed S are stored in the parameter table 171 (see FIG. 3), for example, when the vehicle speed S represented by the driving condition parameter being received from the ECU 200 is "50 km/h", the parameter setting portion 172 reads the concerned parameters from the parameter table 171, and gives these parameters to the reverberation effect applying portions 141L and 141R. Conversely, when the parameters representing the reverberation time RT and the diffusion Dif in response to the vehicle speed S are not stored in the parameter table 171, for example, when the vehicle speed S represented by the driving condition parameter being received from the ECU 200 is "55 km/h", the parameter setting portion 172 reads the concerned parameters from the parameter table 171 by considering correlations with the preceding and succeeding vehicle speeds (in this example, "50 km/h" and "60 km/h"), and gives the parameters derived by applying the interpolation operation to these parameters appropriately to the reverberation effect applying portions 141L and 141R. In the present embodiment, two parameters of the reverberation time RT and the diffusion Dif are used as the parameter representing the reverberation effect, but only one of both parameters may be used. Concretely, the driver may operate an operating piece provided on an instrument panel, or the like to instruct which one of two parameters should be used, and then only the instructed parameter may be given to the reverberation effect applying portions 141L and 141R.

(A-2: Configuration and Functions of the Mixing Balance Setting Section 180)

The mixing balance setting section 180 executes the processes of receiving the driving condition parameters representing the engine speed EC and the accelerator opening AO from the ECU 200, and setting an amplification factor to the amplifiers 142L and 143L and the amplifiers 142R and 143R in response to a time gradient of the engine speed EC and a time gradient of the accelerator opening AO. This mixing balance setting section 180 includes a CPU, and a memory such as a flash ROM, or the like (both not shown in FIG. 1), for example. A control program for causing the CPU to execute the process of setting the mixing balance in a characteristic mode of the present invention is loaded in the memory. The mixing balance setting section 180 functions as respective portions shown in FIG. 4 when the CPU is operated in compliance with the control program.

Figure 4:
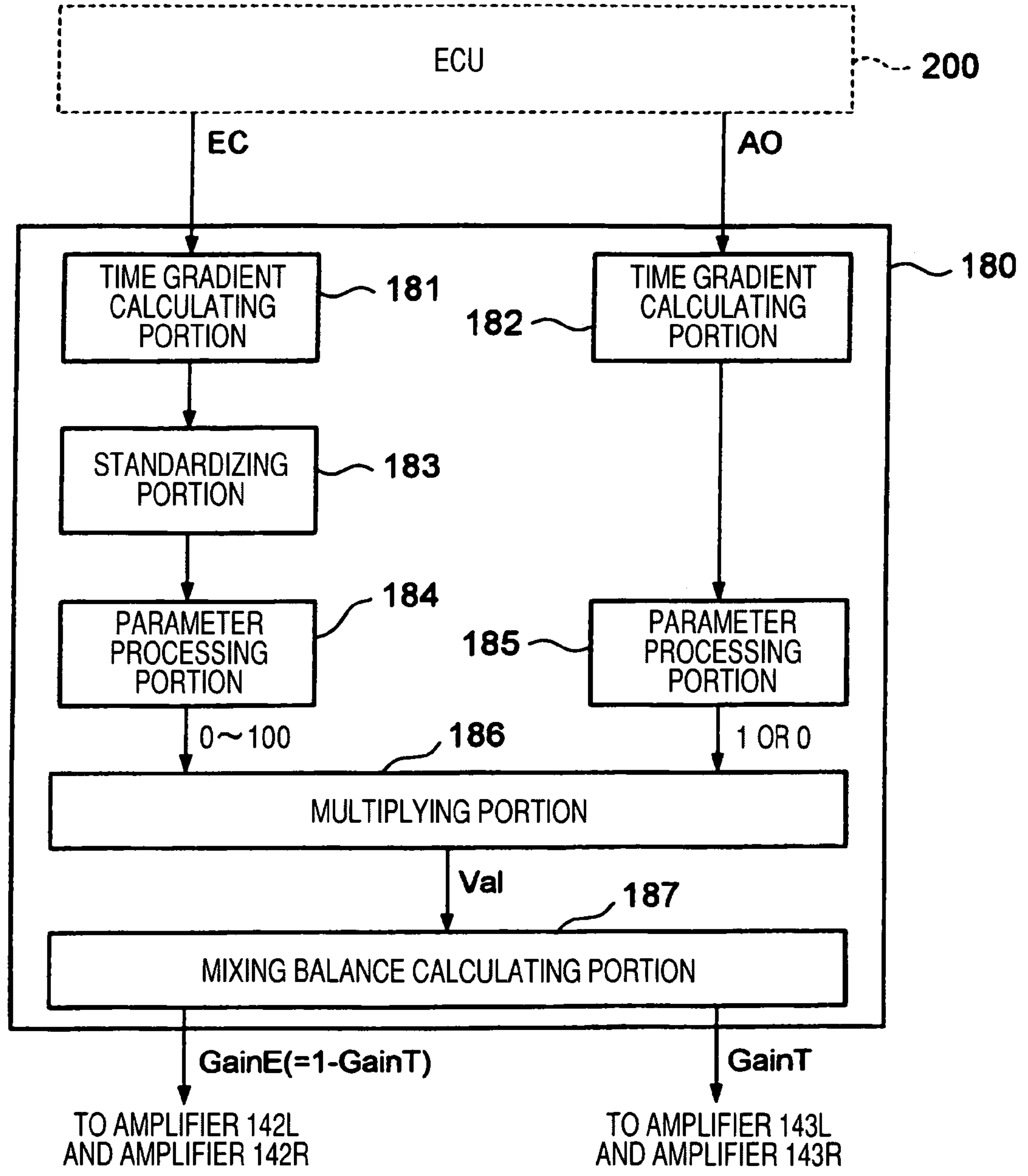
FIG. 4 is a view showing a configurative example of a mixing balance setting section 180.

In FIG. 4, time gradient calculating portions 181 and 182 execute the process of calculating a time derivative of the driving condition parameter by performing a differentiating operation of the driving condition parameter received from the ECU 200 with respect to time respectively. As shown in FIG. 4, in the present embodiment, a time derivative of the driving condition parameter representing the engine speed EC is calculated by the time gradient calculating portion 181, and a time derivative of the driving condition parameter representing the accelerator opening AO is calculated by the time gradient calculating portion 182. A standardizing portion 183 in FIG. 4 standardizes the time derivative calculated by the time gradient calculating portion 181 within a predetermined value range (in the present embodiment, a range from −100 to 100) by applying an computing process such as a coefficient multiplication, or the like. For example, when the time gradient calculating portion 181 calculates a time derivative Din derived within a range of −DM to +DM, the standardizing portion 183 outputs a calculated result Dout by executing the operation given by following Eq. (1).

$$Dout=Din\times100/DM \qquad \text{(Eq.(1))}$$

In FIG. 4, parameter processing portions 184 and 185 first applies either the low-pass filtering process with a predetermined time constant or the process of calculating a moving average of the time derivative train to the time derivatives of the driving condition parameters obtained by the processes executed up to the preceding stage, and then generate envelope data indicating an envelope of the time derivative train. The envelope data calculated in this manner represents a time gradient of the driving condition parameter corresponding to the time derivative train as the source of calculation. More particularly, the event that a value of the envelope data is positive indicates the fact that the corresponding driving condition parameter is increasing as time goes on. Conversely, the event that a value of the envelope data is negative indicates the fact that the corresponding driving condition parameter is decreasing as time goes on. As a result, in the present embodiment, a time gradient of the engine speed EC is specified by the envelope data calculated by the parameter processing portion 184, and a time gradient of the accelerator opening AO is specified by the envelope data calculated by the parameter processing portion 185.

The parameter processing portions 184 and 185 decides whether or not a value of the envelope data calculated in the low-pass filtering process, or the like is positive, and outputs the value corresponding to this decision result to a multiplying portion 186. In more detail, the parameter processing portion 184 outputs such value of the envelope data when the value of the envelope data calculated in the low-pass filtering process, or the like is positive, and also outputs “0” when conversely the value of the envelope data is not positive (“0” or negative). As described above, because respective time derivatives given to the parameter processing portion 184 are normalized in a value range of −100 to +100 by the standardizing portion 183, the output value of the parameter processing portion 184 is a value range of 0 to 100. In contrast, the parameter processing portion 185 outputs “1” when the value of the envelope data calculated in the low-pass filtering process, or the like is positive, and also outputs “0” when conversely the value of the envelope data is not positive (“0” or negative).

Figures 5, 6:
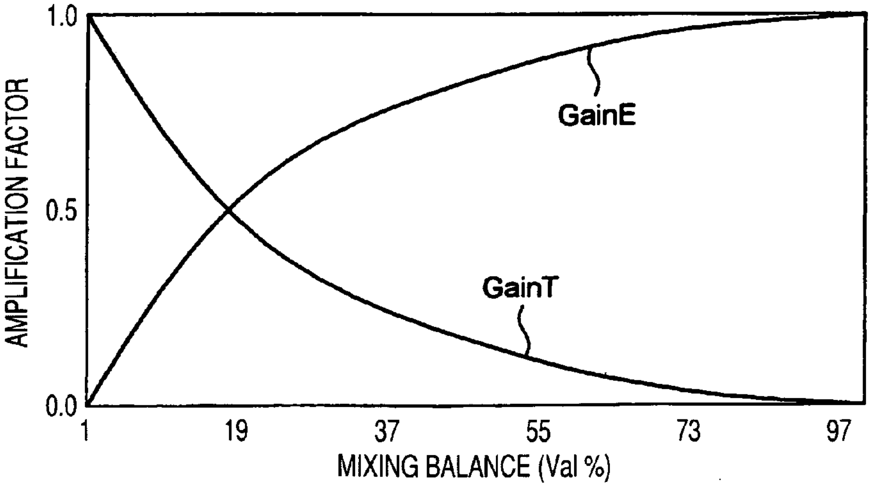
FIG. 5 is a view explaining a relationship between a change of the engine speed EC in time and a change of an accelerator opening AO in time, and a reverberation level of the engine sound output from speakers 160L and 160R.
FIG. 6 is a graph showing an example of an amplification factor set to amplifiers 142 and 143 by the mixing balance setting section 180 respectively.

The multiplying portion 186 gives a value Val, which is obtained by multiplying the output value of the parameter processing portion 184 by the output value of the parameter processing portion 185, to a mixing balance calculating portion 187. As described above, the value of the envelope data is output from the parameter processing portion 184 when the value of the envelope data calculated in the low-pass filtering process, or the like is positive, while “0” is output from the parameter processing portion 184 when conversely the value of the envelope data is not positive. In contrast, “1” is output from the parameter processing portion 185 when the value of the envelope data calculated in the low-pass filtering process, or the like is positive, while “0” is output from the parameter processing portion 185 when conversely the value of the envelope data is not positive. As a result, as shown in FIG. 5, the output value Val of the multiplying portion 186 has a value corresponding to the time gradient of the engine speed EC (a value in a range (0, 100)) only when the engine speed EC is increased as time goes on and the accelerator opening AO is increased as time goes on, and has “0” for other cases.

The mixing balance calculating portion 187 executes the processes of calculating an amplification factor Gain E, which is set in the amplifier 142L and the amplifier 142R, and an amplification factor Gain T, which is set in the amplifier 143L and the amplifier 143R, by executing calculating processes given in following Eq. (2) to Eq. (5) while using the output value Val of the multiplying portion 186, and then setting these amplification factors in the concerned amplifiers respectively.

$$G=-40\times100/\text{Val} \qquad \text{(Eq (2))}$$

$$V0=10(G/20) \qquad \text{(Eq.(3))}$$

$$\text{Gain } T=((1-\text{Val}\times0.01)-V0)*0.2+V0 \qquad \text{(Eq (4))}$$

$$\text{Gain } E=1-\text{Gain } T \qquad \text{(Eq. (5))}$$

FIG. 6 is a graph showing functional relationships between the output value Val of the multiplying portion 186 and Gain E and Gain T calculated by above Eqs. (2) to (5). In the present embodiment, as apparent by reference to FIG. 6, an amplification factor Gain E that is increased like an exponential function as the output value Val of the multiplying portion 186 is increased is set in the amplifiers 142L and 142R by the mixing balance calculating portion 187, and an amplification factor Gain T that is decreased from “1” like an exponential function in response to an increase of Gain E is set in the amplifiers 143L and 143R by the mixing balance calculating portion 187.

With the above, the configuration of the engine sound processing apparatus according to the present embodiment is explained.

According to the engine sound processing apparatus constructed as explained above according to the present embodiment, in the driving scene that the driver of the vehicle intends to enjoy a feeling of acceleration (for example, the driving scene that the driver of the vehicle that is running at a low speed continues to push down on the accelerator pedal until the vehicle speed reaches a desired vehicle speed), the engine sound processed as follows is reproduced in the vehicle interior in response to the vehicle speed S, the time gradient of the engine speed EC, and the time gradient of the accelerator opening AO.

In the course of increasing the engine speed when the driver continues to press down on the accelerator pedal, both the time gradient of the accelerator opening AO and the time gradient of the engine speed EC are positive. Therefore, the amplification factor of the amplifier 142L and the amplifier 142R is increased like an exponential function along with an increase of the engine speed EC, and conversely the amplification factor of the amplifier 143L and the amplifier 143R is decreased like an exponential function (see FIG. 6). As described above, the amplifier 142L and the amplifier 142R are provided to amplify the engine sound signal to which the reverberation effect is applied, and the amplifier 143L and the amplifier 143R are provided to amplify the engine sound signal to which the reverberation effect is not applied. Therefore, in the present driving scene, a sound volume level of the reverberation sound contained in the engine sound reproduced in the vehicle interior is increased gradually as the engine speed EC is increased. Then, when the driver eases up on the accelerator pedal after the running speed of the vehicle comes close to a driver's desired speed, the time gradient of the accelerator opening AO becomes "0" or negative, and the amplification factor of the amplifier 142L and the amplifier 142R is set to "0" and the amplification factor of the amplifier 143L and the amplifier 143R is set to "1". As a result, after the driver eases up on the accelerator pedal as described above, the engine sound to which the reverberation effect is not applied at all is reproduced in the vehicle interior of the above vehicle.

In contrast, the reverberation time RT of the reverberation sound given by the reverberation effect applying portions 141L and 141R is short while the vehicle speed S is slow, and becomes longer as the vehicle speed S is increased. Therefore, the event that a sound volume of the overall engine sound is increased excessively can be avoided by applying the reverberation during when the vehicle speed S is slow. On the contrary, in the course that the engine sound becomes inconspicuous with an increase of the vehicle speed, a feeling such that the engine sound is going to fade out naturally can be produced in the driver by prolonging the reverberation time. Also, the diffusion Dif of the reverberation sound given by the reverberation effect applying portions 141L and 141R is small while the vehicle speed S is slow, and becomes larger as the vehicle speed S is increased. Therefore, a powerful feeling in the initial stage of acceleration can be produced by reducing the diffusion while the vehicle speed S is slow. On the contrary, in the course that the engine sound becomes inconspicuous with an increase of the vehicle speed, a feeling such that the engine sound is going to fade out naturally can be produced in the driver by widening the diffusion. In this manner, according to the engine sound processing apparatus according to the present embodiment, the feeling of acceleration can be produced in line with the driving condition by processing the engine sound picked up in the engine room of the vehicle into the engine sound having the reverberation effect in line with the driving condition.

(B: Other Embodiments)

The embodiment of the present invention is explained as above. Also, it is of course that variations described as follows may be added to such embodiment.

(1) In the above embodiment, the processes of setting a mixing balance between the engine sound, on which the reverberation effect is produced in response to the vehicle speed S, and the engine sound, to which the reverberation effect is not applied, in answer to the engine speed EC and the accelerator opening AO are implemented by the software modules. In this case, such processes may also be implemented by the hardware modules. Concretely, the time gradient calculating portions 181 and 182 may be composed of the differentiating circuit respectively, the parameter processing portions 184 and 185 may be composed of the filter circuit, or the like, and the mixing balance setting section 180 may be constructed by combining these electronic circuits.

(2) In the above embodiment, a mixing balance between the engine sound, to which the reverberation effect is applied in response to the vehicle speed S, and the engine sound, to which the reverberation effect is not applied, is set in answer to the accelerator opening AO and the engine speed EC. Therefore, the natural feeling of acceleration can be produced in line with the driving condition from the engine sound reproduced in the vehicle interior. Further, a more powerful engine sound can be reproduced by applying a distortion (an emphasis or a reduction of the particular frequency component) to the engine sound signals XL and XR in addition to the reverberation effect. This distortion is decided in response to either the feature of the vehicle such as the vehicle type, or the like or the engine speed EC, the accelerator opening AO, the vehicle speed S, or the like, for example. Such arrangement is implemented by replacing the signal processing section 140 shown in FIG. 1 with a signal processing section 240 shown in FIG. 7.

Figure 7:
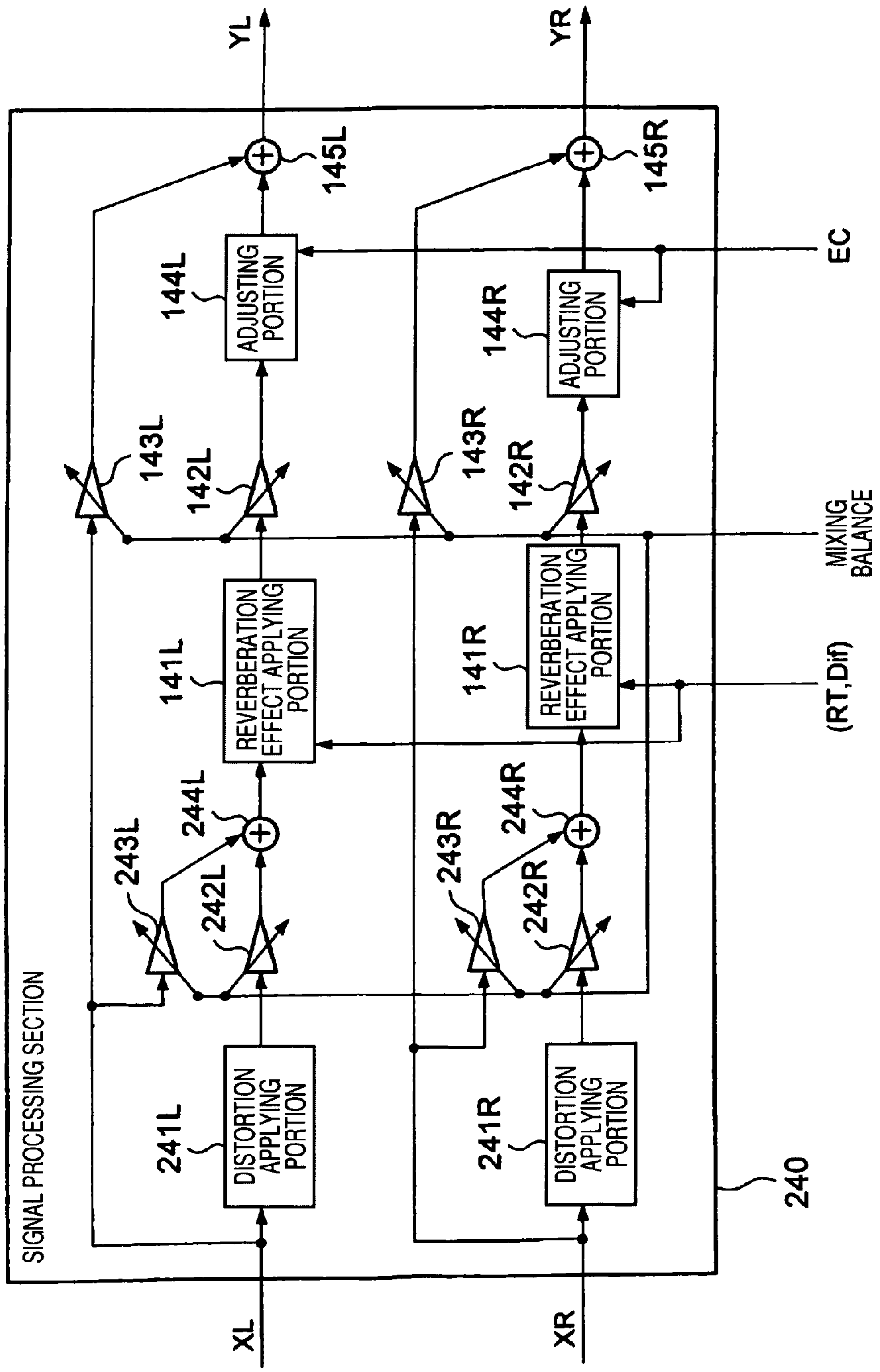
FIG. 7 is a view showing an example of a signal processing section 240 according to Variation 1.

FIG. 7 is a view showing a configurative example of the signal processing section 240 according to the present variation. As apparent from the comparison between FIG. 1 and FIG. 7, the signal processing section 240 is different from the signal processing section 140 in that distortion applying portions 241L and 241R, amplifiers 242L and 242R, amplifiers 243L and 243R, and adders 244L and 244R are provided. In the signal processing section 240, the signal processing applied to the engine sound signal XL and the signal processing applied to the engine sound signal XR are basically identical to each other. Therefore, only the left channel will be explained hereunder.

The distortion applying portion 241R is composed of an equalizer, for example. This distortion applying portion 241R applies a distortion in the engine sound signal XL given from the stereo signal generating portion 130, in response to the feature of the vehicle type, the vehicle speed S, or the like. In such a mode that the distortion is applied in response to the feature of the vehicle type, a parameter table may be stored in advance in the distortion applying portion 241L. In this parameter table, data indicating a timbre or strength of the distortion responding to the feature of the vehicle (i.e., data indicating the frequency component to which an emphasis or a reduction is applied and its extent) are loaded while correlating with identifiers showing a vehicle type such as a sports car, a high-class car, or the like, or a product name of the vehicle, for example. Then, the user may specify the timbre or the strength of the distortion responding to the designated vehicle type or product name, by operating the operating pieces provided on an instrument panel, or the like while looking up the parameter table, and then may cause the distortion applying portion 241L to execute the process of applying the distortion in response to the specified result. According to such mode, the engine sound to which the distortion decided in response to the feature of vehicle regardless of the vehicle speed is applied can be reproduced. In this case, upon designating the feature of the vehicle by inputting the vehicle type, the product name, or the like, either the vehicle type of the vehicle into which the engine sound processing apparatus according to the present variation is installed actually, or the like may be designated or the vehicle type, or the like may be designated irrespective of such engine sound processing apparatus. When the user designates the vehicle type irrespective of the vehicle type of the vehicle into which the engine sound processing apparatus is installed, such user can enjoy conveniently the engine sound of the sports car, the high-class car, or the like. In contrast, in such a mode that the distortion is applied in response to the vehicle speed S, another parameter table may be stored in advance in the distortion applying portion 241L. In this parameter table, data indicating a timbre of the distortion or strength of the distortion responding to the vehicle speed are loaded while correlating with respective vehicle speeds from 0 km/h to 100 km/h, for example. Then, the user may specify the timbre or the strength of the distortion in response to the vehicle speed S represented by the driving condition parameter given from the ECU 200, while looking up the parameter table. Also, when the parameter table representing the timbre or the strength of the distortion in response to the vehicle speed S is prepared every vehicle type, the distortion responding to both the vehicle type and the vehicle speed can be produced. The amplifier 242L amplifies the engine sound signal XL, to which the distortion is applied by the distortion applying portion 241L, at an amplification factor Gain E set by the mixing balance setting section 180, and outputs the amplified signal to the adder 244L. In contrast, the amplifier 243L amplifies the engine sound signal XL, to which the distortion is not applied, at an amplification factor Gain T set by the mixing balance setting section 180, and outputs the amplified signal to the adder 244L. Then, the adder 244L generates a sum signal of respective engine sound signals received from the amplifier 242L and the amplifier 243L, and gives the sum signal to the above reverberation effect applying portion 141L.

More particularly, in the signal processing section 240 shown in FIG. 7, the engine sound signal in which the engine sound signal to which the distortion is applied by the distortion applying portion 241L and the engine sound signal to which the distortion is not applied are mixed at a ratio (Gain E:Gain T) decided in response to the engine speed EC and the accelerator opening AO is input into the reverberation effect applying portion 141L, and then the reverberation effect decided based on the vehicle speed S is produced in this engine sound signal. In this manner, because the distortion decided in response to the feature of the vehicle such as the vehicle type, or the like, the vehicle speed S, or the like as well as the reverberation effect decided in response to the vehicle speed S is produced, the powerful engine sound that makes it possible to enjoy a feeling of acceleration can be obtained. Further, according to the present variation, because the mixing between the engine sound signal to which the distortion is applied by the distortion applying portion 241L and the engine sound signal to which the distortion is not applied is carried out at a ratio decided in response to the engine speed EC and the accelerator opening AO, a natural powerful feeling can be produced in line with the driving condition. Here, both a mixing ratio between the engine sound signal to which the distortion is applied by the distortion applying portion 241L and the engine sound signal to which the distortion is not applied and a mixing ratio between the engine sound signal to which the reverberation effect is applied by the reverberation effect applying portion 141L and the engine sound signal to which the reverberation effect is not applied are set equal mutually in the present variation. But it is of course that both mixing ratios may be set differently. Also, in the present variation, the distortion is applied by the distortion applying portion 241L, and then the reverberation effect is applied by the reverberation effect applying portion 141L. But it is of course that the sequence of both signal processes may be exchanged. Concretely, in FIG. 7, the distortion applying portion 241L and the reverberation effect applying portion 141L may be replaced mutually, and also the distortion applying portion 241R and the reverberation effect applying portion 141R may be replaced mutually.

(3) In the above embodiment, the reverberation effect decided in response to the vehicle speed S is applied by the reverberation effect applying portion 141, then the engine sound signal is amplified by the amplifier 142 at an amplification factor Gain E decided in response to the engine speed EC and the accelerator opening AO, and then the fade-in is applied by the adjusting portion 144 in response to the engine speed EC. But it is of course that the adjusting portion 144 may be provided between the reverberation effect applying portion 141 and the amplifier 142. Also, in such a mode that the fade-in is not applied, it is of course that there is no need to provide the adjusting portion 144.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-214596 filed on Aug. 21, 2007, the contents of which are incorporated herein for reference.

What is claimed is:

1. An engine sound processing apparatus, comprising:

an engine sound signal generating section that generates an engine sound signal indicating an engine sound generated in an engine room of a vehicle;

a signal processing section that includes:

a reverberation effect applying portion which applies a reverberation effect to the engine signal; and a mixing portion which mixes the engine sound signal to which the reverberation effect is not applied and the engine sound signal to which the reverberation effect is applied to output a mixed engine sound signal;

a reverberation effect controlling section that instructs the reverberation effect applying portion to apply the reverberation effect having a reverberation time set in response to a vehicle speed or a width of a diffusion set in response to the vehicle speed to the engine sound signal;

a mixing balance setting section that sets a mixing balance in the mixing portion; and a speaker that outputs a sound on the basis of the engine sound signal being output from the signal processing section, wherein while in a case that both an increasing rate of an accelerator opening and an increasing rate of an engine speed are positive, the mixing balance setting section sets an occupation rate of the engine sound signal to which the reverberation effect is applied in the mixed engine sound signal to be a rate higher than zero, the occupation rate being increased as the engine speed become higher; and wherein when other than the case, the mixing balance setting section sets the occupation rate of the engine sound signal to which the reverberation effect is applied in the mixed engine sound signal to be zero.

2. The engine sound processing apparatus according to claim 1, wherein the signal processing section has an adjusting portion which multiplies the engine sound signal to which the reverberation effect is applied by a coefficient of 1 or less in response to the engine speed when the increasing rate of the engine speed is lower than a threshold value to supply the multiplied engine sound signal to the mixing portion.

3. The engine sound processing apparatus according to claim 1, wherein the signal processing section has a distortion applying portion which applies a distortion, which is determined on the basis of at least one of a feature of the vehicle, the vehicle speed, the engine speed, and the accelerator opening, to the engine sound signal to the reverberation effect applying portion or the engine sound signal being output from the reverberation effect applying portion.

* * * * *